United States Patent
Rieth et al.

(10) Patent No.: US 6,424,907 B1
(45) Date of Patent: Jul. 23, 2002

(54) METHOD AND DEVICE FOR DETERMINING AND DETECTING THE OVERTURNING HAZARD OF A VEHICLE

(75) Inventors: Peter Rieth, Eltville; Alfred Eckert, Mainz; Bernhard Schmittner, Aschaffenburg, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/743,948

(22) PCT Filed: Jul. 16, 1999

(86) PCT No.: PCT/EP99/05079

§ 371 (c)(1), (2), (4) Date: Mar. 23, 2001

(87) PCT Pub. No.: WO00/03900

PCT Pub. Date: Jan. 27, 2000

(30) Foreign Application Priority Data

Jul. 17, 1998 (DE) .......... 198 32 263
Feb. 3, 1999 (DE) .......... 199 04 216

(51) Int. Cl.$^7$ .......... G06F 17/10; G06G 7/48
(52) U.S. Cl. .......... 701/124; 701/29; 340/438; 340/440
(58) Field of Search .......... 701/1, 70, 72, 701/79, 80, 124, 29; 180/170, 197; 340/431, 438, 440

(56) References Cited

U.S. PATENT DOCUMENTS 4,927,173 A * 5/1990 Clifton .......... 280/755
5,825,284 A * 10/1998 Dunwoody et al. .......... 340/440
5,904,218 A * 5/1999 Watkins .......... 180/209

FOREIGN PATENT DOCUMENTS

| DE | 32 22 149 | 11/1983 |
| DE | 42 01 146 | 7/1992 |
| DE | 43 21 571 | 1/1994 |
| DE | 43 42 732 | 6/1995 |
| DE | 44 16 991 | 11/1995 |
| DE | 196 19 381 | 11/1997 |
| DE | 196 23 595 | 12/1997 |
| DE | 197 46 889 | 5/1998 |
| DE | 197 51 935 | 5/1999 |
| EP | 0 758 601 | 2/1997 |

* cited by examiner

Primary Examiner—Gertrude Arthur
(74) Attorney, Agent, or Firm—Rader, Fishman & Grauer PLLC

(57) ABSTRACT

A method and device is disclosed for determining and detecting the rollover hazard of a vehicle through a dynamic detection of variations in the center of gravity of the vehicle. During cornering of the vehicle, first condition variables, which correspond to the respective wheel load, are detected on at least two wheels. The detected first condition variables are compared to reference values representative of the respective cornering maneuver. A corresponding change in the center of gravity is calculated from the differences between the detected first condition variables and the reference values.

8 Claims, 4 Drawing Sheets

$F_{G\_Axle} * (b/2 + y_s) = F_n * b$ $F_G = F_{n\_VL} + F_{n\_VR} + F_{n\_HL} + F_{n\_HR}$
and in the static case for an axle

METHOD AND DEVICE FOR DETERMINING AND DETECTING THE OVERTURNING HAZARD OF A VEHICLE

CROSS-REFERENCES TO RELATED APPLICATIONS

The present application is a U.S. national phase application of International Application PCT/EP99/05079 (International Publication WO00103900), filed Jul. 16, 1999.

TECHNICAL FIELD

The present invention generally relates to systems for measuring vehicle stability, and more particularly relates to a method and a related device for detecting variations of the center of gravity of the mass of a vehicle.

BACKGROUND OF THE INVENTION

Various models for rollover accidents are described on pages 309 to 333, chapter 9, in "Fundamentals of Vehicle Dynamics", by T. D. Gillespie, Society of Automotive Engineers, Inc., Warrendale 1992. Starting with a quasi-stationary model for a rigid vehicle, via a quasi-stationary model for a sprung vehicle up to dynamic models in consideration of inherent roll frequencies, conditions for existing rollover hazards are indicated.

While it was known at the time the above-mentioned book was published that in trucks, truck trailer units, buses, small buses, and off-road vehicles having a high center of gravity and/or a small tread width, there is a rollover risk during cornering in the event of a major roll motion, it has been found only recently that lateral motions of passenger vehicles are also likely to build up until the vehicle rolls over. Such a risk of rollover is considerably increased by improper loading, e.g. extremely toward one side or on the vehicle roof, because the center of gravity of the mass of the vehicle is shifted upwards or to one side.

As is shown in FIGS. 1a and 1b, the analysis of the forces and moments is decisive in the static case for the stable equilibrium of a vehicle.

FIG. 1a shows the distribution of the vehicle weight force $F_G$ to the wheel tread forces $F_{A\_xx}$. The lateral offset $y_s$ of the center of gravity S from the vehicle center is shown in FIG. 1b. The offset of moments with respect to a wheel shows the influence of the shift of the center of gravity in the static and dynamic case.

If, during driving operations, a disturbing force occurs, such as the centrifugal force during cornering or a wheel load variation due to a rough road section, the vehicle will move into the labile or unstable condition depending on the magnitude of the disturbing force.

With an Electronic Stability Program (ESP), for example, the system developed and sold by the applicant, a system is on hand which is apt to detect critical driving conditions by comparing the course of driving predefined by a driver with the actual track of the vehicle, and to prevent these conditions by a well-defined brake intervention. Wheel rotational speeds, the transverse acceleration, the steering angle, and the yaw rate are provided as data for this purpose. In case the driving condition defined by these data reaches a critical range, the proper steering behavior of the vehicle defined by the vehicle model of the ESP controller will be maintained by a wheel-selective brake intervention. Thus, this control action can only influence all two-dimensional processes and condition variables, that means processes which can be described by transverse acceleration and rotation about the vertical vehicle axis (yaw).

Once the position of the center of gravity in a longitudinal and/or transverse direction of the vehicle changes, e.g., due to loading, the changed cornering limit speeds are automatically taken into account in the ESP system because the proper steering behavior determined in the vehicle model shall be maintained. When the center of gravity shifts, e.g. in a rearward direction, the augmented oversteering tendency during cornering is counteracted by reducing the allowed cornering speed, in the event that the basic setting is established as understeering.

A change in the height of the center of gravity will now cause a changed side-tilt behavior of the vehicle in longitudinal and transverse directions. When a transverse acceleration acts on the vehicle, according to FIG. 1b, the analysis of moments $$F_c \times h_s + F_{n\_r} \times b = F_G \times (b/2 + y_s) \tag{1}$$

applies, wherein $F_c$ designates the centrifugal force due to the transverse acceleration $a_{transv.}$, $F_G$ is the center of gravity, m is the vehicle mass, $F_{n\_r,l}$ designates the vertical wheel force (wheel load) for the right and the left wheel, $h_s$, $y_s$ the height of the center of gravity, $y_s$ the lateral distance of the center of gravity from the vehicle center, and b designates the tread width. From this follows directly the correlation for the transverse acceleration $a_{transv.}$.

$$a_{transv.} = 1/h_s \times [g(b/2 + y_s) - F_{n\_r} \times b/m] \tag{2}$$

Rollover of the vehicle will thus be reached when a critical transverse acceleration is exceeded for which the following correlation applies:

$$a_{transv.,critical} = (b/2 + y_s)/h_s \times g \tag{3}$$

Thus, the critical transverse acceleration depends directly on the center of gravity.

Besides, in prior art vehicle motion control systems, wherein the objective is to increase driving stability, especially during cornering, that means to avoid lateral rollover in particular, it is generally the transverse vehicle acceleration or the roll angle of the vehicle which is taken as a basis for critical condition variables that describe the rollover hazard.

Thus, DE-A 197 46 889 describes a system to increase the lateral stability during cornering which is equipped with a side-tilt detection device. This side-tilt detection device measures either the difference in height between the right and the left vehicle side, or the transverse acceleration of the vehicle in order to detect the roll angle between the vehicle horizontal and the roadway horizontal. When the side-tilt detection device detects a rollover hazard, a countersteering yaw torque will be produced by decelerating the curve-outward front wheel.

However, as described hereinabove, the allowed transverse acceleration and the allowed roll angle are greatly responsive to the position of the center of gravity of the vehicle, especially the height of the center of gravity. In the generic methods and devices known from the state of the art, the center of gravity of the vehicle, especially variations in the center of gravity, is not taken into consideration to a sufficient degree as far as a preventive rollover prediction is concerned.

BRIEF SUMMARY OF THE INVENTION

Please delete the abstract on page 13 and replace it with the abstract set forth immediately below in clean form.

Additionally, in accordance with 37 CFR 1.121(b)(iii), all paragraphs amended herein are set forth in a marked up version on the sheets attached to this amendment.

Therefore, an object of the present invention is to provide a method and a device which render it possible to counteract a rollover hazard as early as possible. The primary objective of the present invention is a prediction of an imminent rollover condition of a vehicle to permit a best possible prevention.

According to the present invention, this object is achieved in that first condition variables which correspond to the respective wheel load are detected on at least two wheels during cornering, in that the detected first condition variables are compared with reference values representative of the respective cornering maneuver, and in that a related variation of the center of gravity is calculated from the differences between the detected first condition variables and the reference values.

The present invention is based on the recognition that the most appropriate coefficient of influence in a best possible preventive detection of the rollover hazard of a vehicle is the position of the center of gravity of the vehicle. Thus, the current center of gravity as an output quantity is made the important basis of the method and the device disclosed in the present invention.

The coefficient of influence directly indicates the existence of a critical rollover condition. Either active control interventions, e.g. by means of ESP, or a passive warning to the driver will be considered as a countermeasure to prevent rollover.

In contrast to the state of the art, the preventive procedure disclosed by the present invention includes the advantage that the vehicle remains steerable during a correcting intervention required and the driving comfort is also preserved during an active control intervention. Another advantage of the present invention over the state of the art can be seen in that the possible intervention strategies in response to detection of a critical driving situation are almost optional, not least due to the detection which offers extreme prediction. Therefore, the present invention can be realized without special effort and cost as an extension or an improvement of an existing driving stability control system, for example, the Electronic Stability Program (ESP) of the applicant.

The spring travel that can be measured at the wheel suspension, the spring pressure, the damper pressure that can be measured at the shock absorber, the inside tire pressure, or the lateral deformation of the tire can be made the basis of a first condition variable that is correlated to the wheel load.

DETAILED DESCRIPTION OF THE PREFERRED EMBODIMENTS

The embodiment described hereinbelow relates to modifications in an Electronic Stability Control system (ESP). In contrast to the two-dimensional model used in the state of the art, the present invention is based on a three-dimensional vehicle model wherein beside the transverse acceleration and the yaw, also pitching and rolling of the vehicle can be taken into account, with the result that the rollover tendency is also considered a value of the critical condition variable. A principal adaption of the vehicle model in consideration of the current static center of gravity will considerably support the control success. But also a reaction only to the side-tilt behavior of the vehicle will achieve already a major improvement of stability control.

Figure 1B:
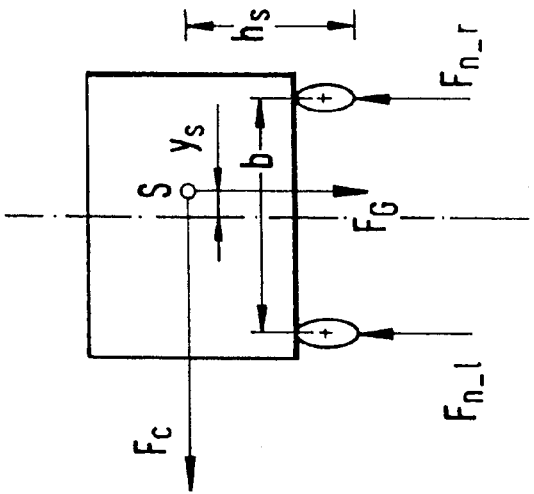
FIG. 1b is a schematic rear view of a four-wheel vehicle also in a right-curve cornering maneuver.
Figure 1A:
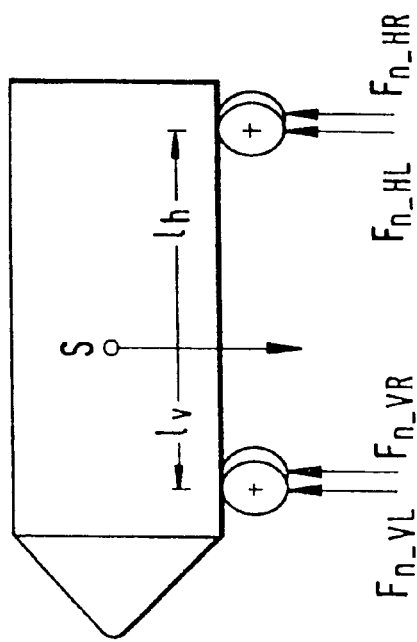
FIG. 1a is a schematic side view of a four-wheel vehicle in a cornering maneuver.
Figure 2:
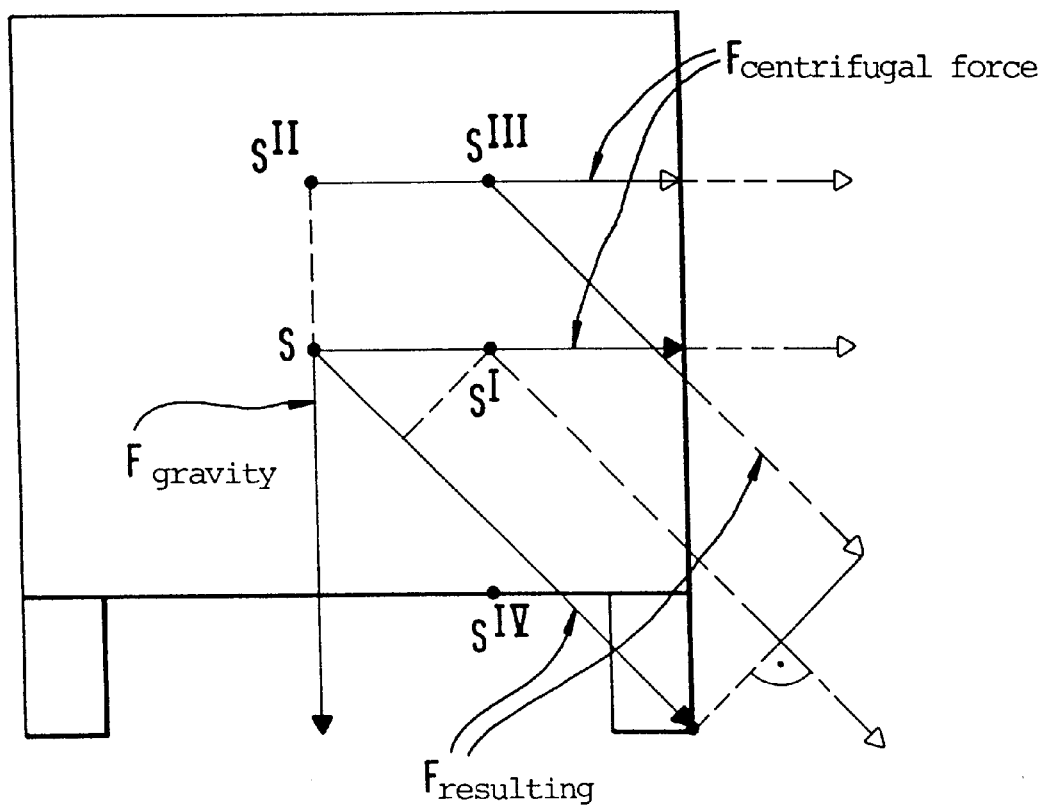
FIG. 2 is a rear view of a vehicle in a left curve, corresponding to FIG. 1, to represent the physical condition variables related to driving for the description of a rollover condition.

The information required for determining the center of gravity and the vehicle side-tilt may preferably be obtained from the spring travel variations. The center of gravity can be determined by a measurement of the static compression travel with respect to axles without level control device or by a measurement of the pressure in the level control device. With a known spring rigidity C of the chassis support spring, the wheel normal force $F_{n\_xx}$ (FIG. 1a) can be determined from the known force $F_{n\_xx\_o}$ in the construction position with spring travel $S_{\_xx\_o}$ as follows:

$$F_{n\_xx} = F_{n\_xx\_o} + K.\Delta S$$

wherein $\Delta S$ represents the measured spring travel variation with a direction-responsive sign (positive for compression travel, negative for rebound travel).

A level control device compensates a compression travel, thus, $\Delta S$ becomes 0. The system pressure variation $\Delta p$ necessary for this compensation is proportional to the change in force, and consequently $$F_{n\_xx} = F_{n\_xx\_o} + K.\Delta p$$

applies, wherein k is the proportionality factor.

The roll angle is determined by way of the different spring travels on the left and the right vehicle side, and the pitch angle is determined accordingly by way of the spring travels on the front and the rear end.

The height of the center of gravity can be calculated from the side-tilt angle and the associated acceleration. The center of gravity in a longitudinal and transverse direction ($l_v$, $l_h$, $y_s$) is known from the static analysis. The height of the center of gravity may hence be derived from the correlation described hereinabove, with the transverse acceleration known, according to $$h_s = 1/a_{transv.} * [g(^{b\prime}/_2 + y_s) - F_{n\_r} * ^{b\prime}/_m]$$

or, with the longitudinal acceleration known, according to $$h_s = \frac{1}{along.} * \left[ \frac{Fn - VA}{m} \cdot l_v - \frac{Fn - HA}{m} \cdot l_r \right]$$

A center of gravity shifted from the vehicle center can be determined by the roll angle which is different responsive to the direction, with a transverse acceleration existing. Thus, e.g. for a vehicle with a level control device at the rear axle, four sensors for determining the spring travel are required and, in the event of an axle control on each individual wheel, one or two sensors for determining the pressure in the level control device of the rear axle are required.

Figure 3:
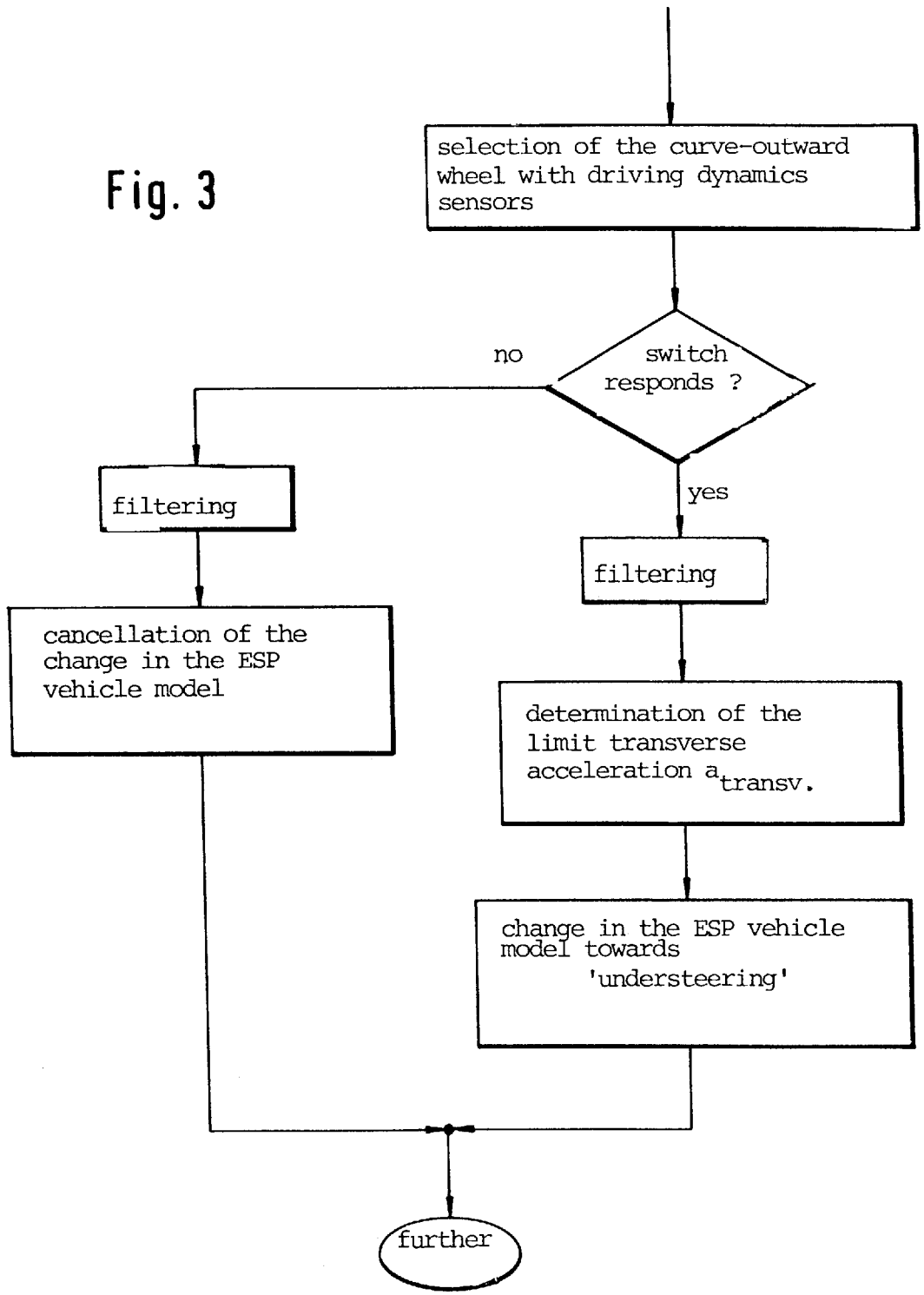
FIG. 3 is a flow chart showing a preferred sequence of operation of the method according to the present invention and the corresponding device.

The flow chart shown in FIG. 3 illustrates an exemplary sequence of operation of a modified ESP control, wherein an end position switch is used corresponding to the mentioned simplified embodiment of this invention. The end position switch responds when a predetermined spring travel threshold value in one or more of the vehicle wheels is exceeded, that means, when a predetermined wheel load is exceeded with respect to the prevailing forces. Because the mode of operation of the end position switch hence depends on the direction of cornering, it is first of all necessary to find out which wheel (the wheel on the front axle is preferred) or which wheels are disposed on the curve-outward side of the vehicle. This is because only the curve-outward wheels are able to respond in the mentioned manner corresponding to the vehicle tilt during cornering. The selection of the curve-outward wheels can be effected by means of sensors related to driving dynamics, e.g., a steering angle sensor and/or a yaw rate sensor, which are already provided in an ESP system. In general, other sensors may also be used which permit determining the direction of a cornering maneuver.

In the event that one or more of the end position switches arranged on the curve-outward side of the vehicle respond, the variation of the ESP vehicle model which has already been described in detail hereinabove will be performed. It is initially necessary, however, to check or filter the switch signals received to the end that those signals are "filtered out" which induced one or more end position switches to respond due to road conditions, e.g. due to bumps, although there was no cornering maneuver and, consequently, there was no rollover hazard.

In consideration of further quantities related to driving dynamics, for example, the steering angle and the vehicle speed, a corresponding change of the center of gravity of the vehicle is calculated, and from the change center of gravity a changed or corrected limit transverse acceleration is calculated by way of the mathematical correlations mentioned hereinabove. By way of the corrected limit transverse acceleration, the ESP vehicle model will then be changed in a manner such that the vehicle temporarily becomes "understeering" and is, hence, better adapted to the changed center-of-gravity conditions.

In the normal case, the end position switch will no longer respond after termination of the cornering maneuver. The correspondingly filtered signal cancels the temporary change of the ESP vehicle model and, thus, reestablishes the condition of the ESP prior to the cornering maneuver.

In the embodiment referred to above, the ESP vehicle model is modified only temporarily, i.e., during cornering maneuvers. It may, however, also be provided that on command of the mentioned signals of the end position switch, there is a reaction to changed center-of-gravity conditions that is followed by permanent variations of the ESP vehicle model. The above-mentioned statements will apply accordingly in this case.

Due to the knowledge about a changed center of gravity, the vehicle model prevailing in an Electronic Stability Program (ESP), for example, the program of the applicant, can be adapted to the changed center-of-gravity conditions. It is initially necessary in the adaptation of the ESP control, to predefine a critical condition variable, for example, a limit transverse acceleration $aq_{limit}$, in consideration of the current quantity and position of the vehicle center of gravity. This limit acceleration, in the capacity of a parameter variation, can be taken into consideration within the vehicle model in the form of a variation=basic variation+k×f ($a_{transv.,limit}$) (4) in the ESP control, and $a_{transv.}$ designates the current value of the transverse vehicle acceleration and $a_{transv.,limit}$ designates the corresponding critical limit value. Besides, 'F' is a proportional factor and f(x) is a function with a predetermined top and bottom limit, wherein it applies for the bottom limit that the change must not become less than zero. The above-mentioned functional correlation can preferably be implemented as a P-controller or PI-controller, with the addend on the right side of the equation (4) being configured to either act proportionally as a P-controller, i.e., according to the relation $$k \times [abs(a_{transv.}) - abs(a_{transv.,limit})], \quad (5)$$

or proportional-integrally as a PI-controller, i.e., according to the following equation:

$$k \times [abs(a_{transv.}) - abs(a_{transv.,limit})] + k \times \text{integral}[abs(a_{transv.}) - abs(a_{transv.,limit})], \quad (6)$$

A change to 'understeering' can be defined by way of lateral rigidities.

In the vehicle model of ESP (single-track model)

$m \cdot v \cdot (\dot{\psi} - \beta)$ $F_{lateral\ force}$ front+$F_{lateral\ force}$ rear $\Theta \ddot{\psi} = F_{sv} \cdot l_v - F_{sh} \cdot l_n$ with $F_{Sv} = C_{SV} \cdot \left(\delta + \beta - \frac{lv \cdot \psi}{v}\right)$ with $F_{Sh} = C_{Sh} \cdot \left(\beta \frac{lh \cdot \psi}{v}\right)$ the lateral tire rigidities $C_{Sv}$, $C_{sh}$, front and rear, are comprised.

$C_{sv,sh}$ may now be understood as $C_{sv}$, $C_s$ for the normal operation and $C_{1sh}$, $C_{1sh}$ may be added as variable component.

$C_{sv} = C_{0sv} + C_{1sv}$ $C_{sh} = C_{0sh} + C_{1sh}$

These $C_{1sv}$, $C_{1sh}$ may now be changed in dependence on the transverse acceleration, as described on page 10 (P, PI-controller), namely $C_{1sv}$ smaller $C_{1sh}$ greater so that an ESP brake intervention on the curve-outward wheel stabilizes the vehicle.

When the curve limit acceleration or speed which is predetermined by the possibly changed center of gravity or center of gravity mass is exceeded, an intervention which prevents rollover, such as a brake intervention, may be carried out. Corresponding intervention strategies are e.g. disclosed in applications 198 21 593.2 and 198 16 430.0, to which reference is made herein in full extent. Thus, values may again drop below the critical condition variable, e.g. the transverse acceleration, by a defined understeering of the vehicle, especially by a corresponding re-tuning or readjustment of the vehicle model on which the ESP control actions are based, whereby rollover is prevented.

Only the roll behavior of the vehicle is taken into consideration in a simplified embodiment. When it is further assumed that the center of gravity is shifted only insignificantly from the longitudinal vehicle axis, one spring travel information per axle is sufficient. A critical situation may also be recognized by only one single spring travel when the height of the center of gravity remains virtually the same. In this arrangement, the vehicle model is conformed to the roll behavior, and the allowed transverse acceleration is reduced while the defined inherent steering behavior is maintained. This adaptation can be effected analogously, e.g., by means of information given by sensor signal(s), and digitally, e.g., by means of information given by switches. In view of the above, the most simple embodiment is a spring travel switch on one wheel which will be described hereinbelow by way of FIG. 4.

Figure 4A:
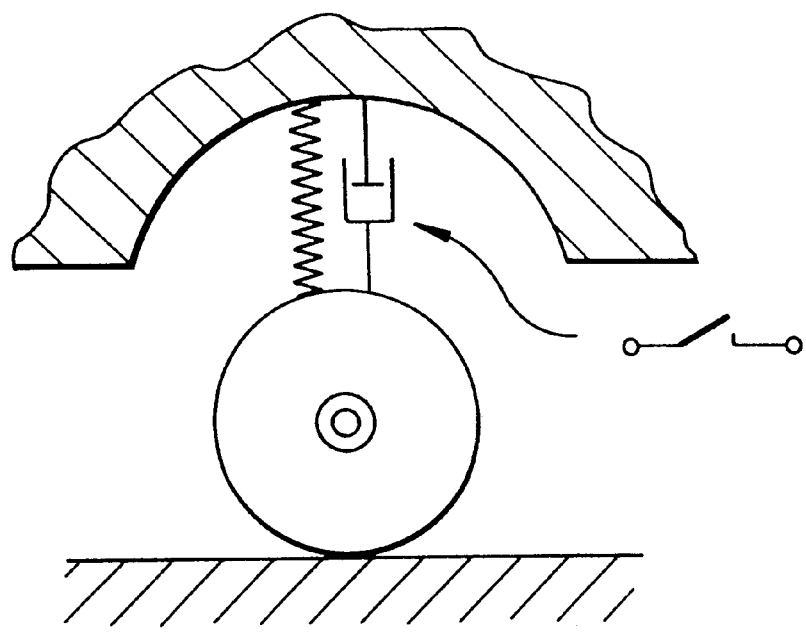
FIG. 4 is a schematic view of a preferred embodiment of the device of the present invention including a spring travel switch at one wheel and a characteristic curve that illustrates the point of time of switching of the spring travel switch.
Figure 4B:
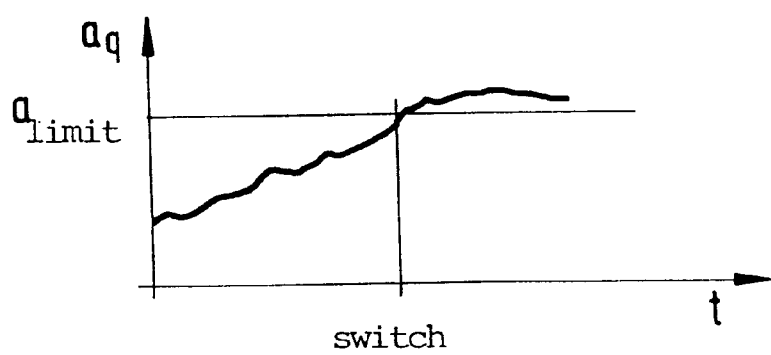

One preferred embodiment of an end position switch relating to a simplified way of control is represented in FIG. 4a. This way of control can be realized advantageously as an ESP that is extended by an end position switch arranged at the shock absorber or at the spring of the wheel suspension. The following procedure is advisable corresponding to the time variation shown in FIG. 4b with respect to an end position switch configured as a spring travel switch. When the switch on at least one curve-outward wheel, which is preferably the outward front wheel, responds, the critical transverse acceleration $a_{transv.,limit}$ will be exceeded corresponding to the assumed course of characteristic curve, and a defined counteraction is initiated to prevent further buildup of the transverse acceleration or to reduce it.

Understeering of the vehicle is preferred, for example, by means of a corresponding 're-tuning' of the ESP vehicle model to become 'understeering', that means by a change in the travel trajectory, for example, by a way of control corresponding to equations (4) to (6).

The variation may be defined by way of the lateral rigidities of the tires, and 'understeering' means that the lateral rigidity at the front axle of the vehicle diminishes.

The intervention into the vehicle model causes braking and, thus, reduction of the cornering force at the curve-outward wheel. With respect to the physical correlation between cornering force and brake slip (longitudinal force), reference is made in the present context in full extent to German published patent application DE-A 196 32 943 'Method for operating an automotive vehicle with brake interventions that stabilize driving', by Daimler-Benz AG.

When the switch closes again, this variation will be cancelled with time, i.e., forgotten. This control action will be terminated herewith.

Monitoring of the switch is possible also by way of a plausibility analysis. It may be provided, for example, that during straight travel the switch is only allowed to close for a minimum duration of e.g. 200 msec before countermeasures to reduce the transverse acceleration are activated. Alternatively, it may be provided that the triggering of countermeasures, beside the switch position, is linked to further conditions, for example, a threshold value for the transverse acceleration, such as >0.5–0.7 g.

What is claimed is:

1. A method for detecting the rollover hazard of a vehicle that includes at least two axles and at least three wheels, wherein variations in the vehicle's center of gravity are determined in the operation of the vehicle during cornering, comprising the steps of:

detecting first condition variables which respectively correspond to each respective wheel load during cornering on at least two wheels, comparing each detected first condition variable to reference values representative of the respective cornering maneuver, calculating a corresponding change in the center of gravity from the differences between the detected first condition variables and the reference values, and determining a correspondingly changed, critical second condition variable representative-of the rollover hazard from the calculated center of gravity variation.

2. The method as claimed in claim 1, further including the step of using at least one of a spring travel that can be measured at the wheel suspension, a spring pressure, a damper pressure that can be measured at a shock absorber, an inside tire pressure, and a lateral deformation of the vehicle tire as a basis for a first condition variable that corresponds to the wheel load.

3. The method as claimed in claim 1, further including the step of using at least one of a transverse acceleration which acts on the center of gravity of the vehicle, a roll angle of the vehicle, a pitch angle of the vehicle, a vehicle speed, a steering angle, and a yaw rate as a basis for the second condition variable representative of the rollover hazard.

4. A device for detecting the rollover hazard of a vehicle that includes at least two axles and at least three wheels, comprising:

a means for sensing a driving condition in a cornering maneuver, a means for determining variations in the center of gravity of mass, a means to detect first condition variables which correspond to the respective wheel load on at least two wheels, a means to compare the detected first condition variables with reference values representative of the respective cornering maneuver, a means to calculate the change in the center of gravity from the differences between the detected first condition variables and the reference values, and a means to determine a second condition variable representative of the rollover hazard from the calculated center of gravity variation.

5. The device as claimed in claim 4, further including means for measuring at least one of the wheel suspension spring travel, the wheel suspension spring pressure, the shock absorber damper pressure, the pressure of the air inside of the tire, the lateral deformation of the tire, and using such measurement as a basis for the first condition variable that corresponds to the wheel load.

6. The device as claimed in claim 4, further including means for measuring at least one of the transverse acceleration which acts on the center of gravity of the vehicle, the roll angle of the vehicle, the pitch angle of the vehicle, the vehicle speed, the steering angle, the yaw rate, and using such measurement as a basis for the second condition variable representative of the rollover hazard.

7. The device as claimed in claim 4, further including an end position switch provided on a shock absorber or on a spring element of the wheel suspension, the switching point of the end position switch is linked by a time correlation to the second condition variable representative of the rollover hazard.

8. The device as claimed in claim 7, wherein the switching point of the end position switch is linked to further driving state conditions.

* * * * *

UNITED STATES PATENT AND TRADEMARK OFFICE
CERTIFICATE OF CORRECTION

PATENT NO.    : 6,424,907 B1
DATED         : July 23, 2002
INVENTOR(S)   : Peter Rieth, Alfred Eckert and Bernhard Schmittner It is certified that error appears in the above-identified patent and that said Letters Patent is hereby corrected as shown below:

<u>Column 7,</u>
Line 60, change "representative-of" to -- representative of --.

Signed and Sealed this

Fourth Day of March, 2003

JAMES E. ROGAN
*Director of the United States Patent and Trademark Office*